United States Patent Office 3,493,656
Patented Feb. 3, 1970

---

3,493,656
INSECTICIDAL AND MITICIDAL METHODS EMPLOYING PHOSPHONATED MERCAPTALS AND MERCAPTOLES
Edward Nelson Walsh, Chicago Heights, Ill., and David J. Broadbent, San Jose, Calif., assignors to Stauffer Chemical Company, New York, N.Y., a corporation of Delaware
No Drawing. Original application July 9, 1964, Ser. No. 381,512, now Patent No. 3,373,230, dated Mar. 12, 1968. Divided and this application Dec. 20, 1967, Ser. No. 731,346
Int. Cl. A01n 9/36
U.S. Cl. 424—216                                 5 Claims

---

ABSTRACT OF THE DISCLOSURE

Phosphonated mercaptals and mercaptoles corresponding to the formula

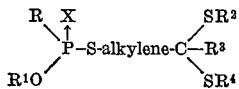

in which "alkylene" means a divalent saturated aliphatic having from 1 to 3 carbon atoms; X is oxygen or sulfur; R is lower alkyl or phenyl; $R^1$ is lower alkyl; $R^2$ and $R^4$ are independently lower alkyl, phenyl or halo-substituted phenyl; and $R^3$ is lower alkyl or hydrogen. The above compounds are effective insecticides and miticides. Representative compounds are O-ethyl-S-[2,2-bis(ethylthio)propyl-1]ethylphosphonodithioate,
O-ethyl-S-[2,2-bis(ethylthio)propyl-1]methylphosphonodithioate,
O-ethyl-S-[2,2-bis(4-chlorophenyl)propyl-1]methylphosphonodithioate and
O-ethyl-S-[2,2-bis(butylthio)propyl-1]ethylphosphonodithioate.

---

This application is a division of copending application Ser. No. 381,512, filed July 9, 1964, now U.S. Patent No. 3,373,230.

The present invention is concerned with a novel group of phosphonated mercaptals, their method of preparation and use as pesticides.

The novel compounds may be represented by the general formula:

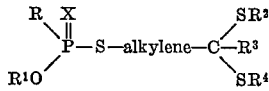

wherein "alkylene" means a divalent saturated aliphatic having from 1 to 3 carbon atoms; X is selected from the group consisting of sulfur and oxygen; R is lower alkyl or phenyl; R' is lower alkyl; $R^2$ and $R^4$ are independently selected from the group consisting of lower alkyl, phenyl, and halo-substituted phenyl; and $R^3$ is lower alkyl or hydrogen.

The lower alkyl radicals which are suitable for R, R', $R^2$, $R^3$, and $R^4$ are the straight and branched chain aliphatic radicals having from 1 to 8 carbon atoms and include, for example, methyl, ethyl, propyl, isopropyl, amyl, 2-ethylhexyl, and the like. The halo-substituted phenyl included under the definition of $R^2$ are the chloro, bromo, or fluoro substituted, and preferably chloro.

The general process for preparing the compounds of the invention may be illustrated by the following equation:

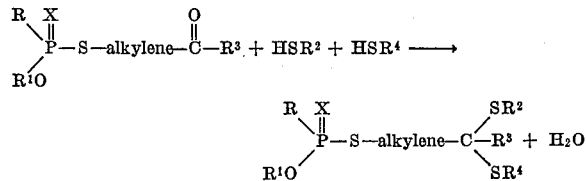

wherein all of the substituents are the same as defined hereinbefore. The reaction is preferably carried out in the presence of a strong acid catalyst such as boron trifluoride etherate or gaseous HCl; an inert solvent such as benzene, ether, and the like may be used, but is not required. Reaction temperatures, while they need not be critically controlled during these reactions, are normally maintained between about 0° C. and 100° C.; preferably between 10° C. and 50° C. Higher temperatures may cause appreciable side products to form due to an attack by the acid catalyst.

In the preferred process, the mercaptans or 2 moles of a single mercaptan (where $R^2$ and $R^4$ are to be identical) are added to the phosphonated aldehyde or ketone before addition of the catalyst. When $R^2$ and $R^4$ are to be different radicals, one mercaptan may be first added, then some of the catalyst, and after the first reaction is fairly well along, usually within ten to thirty minutes, the same order of addition (i.e., reactant first, then catalyst) may be used for a reaction of the second mercaptan. Although the order of addition may have some slight effect on yields, it is not a critical feature of the invention. Recovery of a pure phosphonated mercaptal product from the reaction mixture requires washing the reaction mixture to remove side products, unreacted compounds, and the acid catalyst. For convenience, the reaction mixture may first be dissolved in an inert organic solvent such as benzene or ether. The washing may be accomplished with water or aqueous sodium hydroxide, sodium carbonate, sodium sulfate solutions (to remove the unreacted aldehyde or ketone), and the like. Normally, the reaction will yield between 85% and 100% of the theoretically predicted amount of phosphonated mercaptal.

The general process for preparing the novel phosphonated aldehyde or ketone intermediate shown in the above equation may be illustrated by the following reaction:

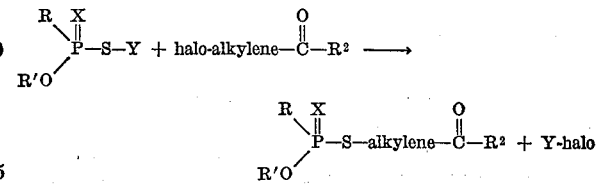

wherein "halo" means a halogen radical such as chlorine, bromine, or iodine; Y means an alkali metal and includes for example, sodium and potassium; "alkylene" means a divalent saturated aliphatic having from 1 to 3 carbon atoms; R and R' are lower alkyl; X is oxygen or sulfur; and $R^2$ is an alkyl of from 1 to 3 carbon atoms or hydrogen. Reaction temperatures, while they need not be critically controlled during these mildly exothermic reactions are normally maintained between about 0° C. and 100° C. preferably between 20° C. and 50° C. A specific example of a compound prepared by the aforementioned process is illustrated in U.S. Patent application Ser. No. 381,509, dated July 9, 1964.

The following examples illustrate specific compounds of the invention and their method of preparation, but should not be construed as unduly limiting the broader aspects of the invention.

EXAMPLE 1

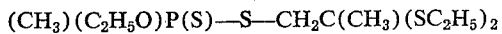

To 8.0 grams of

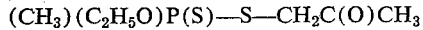

contained in a reactor flask fitted with a stirrer and thermometer was added 20 ml. of ethanthiol. Then 0.5 ml. of boron trifluoride etherate was added to catalyze the reaction. The temperature was maintained between 27° C. and 32° C., and the reaction mixture stirred for 18 hours. The mixture was dissolved in 100 cc. of ethyl ether, twice washed with 50 cc. of water, filtered and concentrated to 60° C. under 1 mm. of Hg. The concentrated product consisted of 10.2 grams (85% yield) of O-ethyl-S-[2,2 - bis(ethylthio)propyl - 1]methylphosphonodithioate having an index of refraction $N_D^{25}=1.5563$, and analysis of 9.9% P and 38.9% S as compared to 9.8% P and 40.3% S, theoretical.

EXAMPLE 2

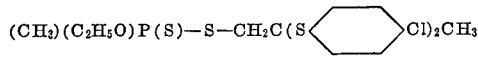

To 5.3 grams of $(CH_3)(C_2H_5O)P(S)$—S—$CH_2C(O)CH_3$ contained in a reactor flask fitted with a stirrer and thermometer was added 7.2 grams of 4-chlorobenzenethiol. The reactants were dissolved in 20 ml. of ethyl ether; 3 ml. of boron trifluoride etherate was added to catalyze the reaction. The temperature was maintained between 20° C and 22° C. Then 5 grams of $Na_2SO_4$ was added and the temperature rose to 28° C. The reaction mixture was stirred for 18 hours and then transferred to a separating funnel and dissolved in 100 ml. of ethyl ether. The mixture was washed twice with 50 ml. of water, counterwashed with 50 cc. of ethyl ether and dried over $Na_2SO_4$. After concentrating to 60° C. under 1 mm. Hg the product consisted of 12.2 grams (100% yield) of O-ethyl-S-[2,2-bis(4 - chlorophenyl)propyl - 1]methylphosphonodithioate having an index of refraction $$N_D^{25}=1.6160$$

and analysis of 5.7% P, 25.4% S, and 14.1% Cl as compared to 6.4% P, 26.5% S, and 14.7% Cl, theoretical.

The following specific compounds were prepared by a procedure substantially in accordance with those of Examples 1 and 2:

EXAMPLE 3

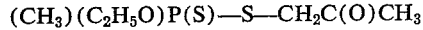

O-ethyl-S - [2,2 - bis(butylthio)propyl - 1]methylphosphonodithioate.

EXAMPLE 4

$(C_2H_5)(C_2H_5O)P(S)$—S—$CH_2C(SC_2H_3)_2CH_3$

O-ethyl - S - [2,2 - bis(ethylthio)propyl - 1]ethylphosphonodithioate.

EXAMPLE 5

$(C_2H_5)(C_2H_5O)P(S)$—S—$CH_2C(SC_4H_9)_2CH_3$

O-ethyl - S - [2,2 - bis(butylthio)propyl - 1]ethylphosphonodithioate.

EXAMPLE 6

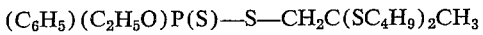

O-ethyl - S - [2,2 - bis(butylthio)propyl - 1]phenylphosphonodithioate.

EXAMPLE 7

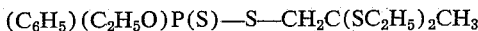

O-ethyl-S-[2,2 - bis(ethylthio)propyl - 1]phenylphosphonodithioate.

The new compounds have been found to be generally active as pesticides, but exhibit exceptionally high activity with the two-spotted mite, Tetranychus telarius(Linn.). Pesticidal activity for the phosphonated mercaptals is illustrated in Table I wherein the 50% kill ($LD_{50}$) among the pest species is reported for a specified quantity of candidate compound expressed in micrograms ($\mu$g.- herein termed the biossay test), or for a percentage concentration in aqueous dispersion (herein termed the screening test).

Insect species

Housefly—*Musca domestic* (Linn.).
American cockroach—*Periplaneta americana* (Linn.).
Spotted milkweed bug—*Oncopeltus fasciatus* (Dallas).

Mite species

Two-spotted mite—*Tetranychus telarius* (Linn.).

TABLE I.—MORTALITY OF REPRESENTATIVE SPECIES OF COMMON INSECT ORDERS AND MITES, $LD_{50}$

| Compound (Example number, sec supra) | M. domestica | P. americana | O. fasciatus | T. telerius Post embryonic | Nymphs | Eggs | Systemic |
|---|---|---|---|---|---|---|---|
| 1 | 30µg. | 0.03 | 0.1 | 0.01 | 0.01 | 0.05 | 8 p.p.m. |
| 3 | 0.1 | | 0.1 | 0.01 | 0.01 | 0.1 | |
| 4 | 10µg. | 0.03 | | 0.005 | 0.005 | | 3 p.p.m. |
| 5 | 0.1 | | | 0.05 | 0.08 | 0.1 | |

In the screening tests for the insect species of Table I, from ten to twenty-five insects were caged in cardboard mailing tubes 3⅛" in diameter and 2⅝" tall. The cages were supplied with cellophane bottoms and screen tops. Food and water were supplied to each cage. Dispersion of the test compounds were prepared by dissolving one-half gram of the toxic material in 10 ml. of acetone. This solution was then diluted with water containing 0.0175% v/.v. Sponto 221, an emulsifying agent, the amount of water being sufficient to dilute the active ingredients to a concentration of 0.1% or below. The test insects were then sprayed with this dispersion. After twenty-four and seventy-two hours, counts were made to determine living and dead insects.

Some of the compounds which showed high mortality on house flies in the screening test were bioassayed on *M. domestica*. In this test, a known quantity of the toxicant was placed in a confined area. The same cages were employed as for the flyscreening test. A weighed amount of the toxicant was placed in Pyrex petri dishes having a surface area of 18.8 sq. centimeters along with 1 ml. of acetone. After the solvent was evaporated by air-drying, a cage containing groups of twenty-five female flies, three to five days old, was placed over the residue. Counts of living and dead insects were made forty-eight hours after initiation of the test.

It has been further found that the compounds of the present invention are excellent systemic miticides. In testing for systemic action, pinto bean plants were placed in bottles containing 200 ml. of test solution and were held in place with cotton plugs. Only the roots were immersed. The solutions were prepared by dissolving the candidate miticide in acetone or other suitable solvent and then diluting with tap water. The final acetone concentration of the solution was never allowed to exceed 1% and the toxicant was initially tested at a concentration of 100 p.p.m. As soon as the plants were placed in the solution they were infected with mites. Mortalities of post embryonic, nymph, and ovicidal forms were determined seven days after initiation of the test.

Although the above tests were accomplished with aqueous dispersions, the toxic compounds can also be used commercially in the form of aqueous solutions when appreciably soluble, non-aqueous solutions, wettable powders, vapors, and dusts as best suited to the conditions of use. In many applications fillers will be incorporated with the toxic compounds. For more specialized application, the material may even be used in its pure, undiluted form.

When used herein the term "pest" is intended in the restricted sense generally recognized in the art as applying to the lower forms of life customarily controlled by chemical means and excluding the higher animals, the vertebrates, for example, rodents, birds, and larger forms which are more commonly controlled by mechanical means such as traps. It will be apparent to one skilled in the art that the toxic activity demonstrated hereinbefore on various test species is indicative of activity with species and orders not specifically shown.

The foregoing description is given for clearness of understanding only and no unnecessary limitations should be understood therefrom, as modifications will be obvious to those skilled in the art.

We claim:

1. A method of controlling pests selected from the group consisting of mites and insects which comprises contacting the pests with a pesticidal amount of at least one compound having the formula

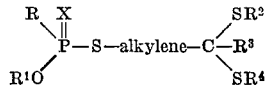

wherein "alkylene" means a divalent saturated aliphatic having from 1 to 3 carbon atoms; X is selected from the group consisting of sulfur and oxygen; R is selected from the group consisting of lower alkyl and phenyl; R' is lower alkyl; $R^2$ and $R^4$ are independently selected from the group consisting of lower alkyl, phenyl, and chloro-substituted phenyl; and $R^3$ is lower alkyl or hydrogen.

2. A method of controlling pests selected from the group consisting of mites and insects which comprises contacting the pests with a pesticidal amount of O-ethyl-S-[2,2 - bis(4 - chlorophenyl)propyl-1]methylphosphonodithioate.

3. A method of controlling pests selected from the group consisting of mites and insects which comprises contacting the pests with a pesticidal amount of O-ethyl-S-[2,2-bis(ethylthio)propyl-1]methylphosphonodithioate.

4. A method of controlling pests selected from the group consisting of mites and insects which comprises contacting the pests with a pesticidal amount of O-ethyl-S-[2,2-bis(ethylthio)propyl-1]phenylphosphonodithioate.

5. A method of controlling pests selected from the group consisting of mites and insects which comprises contacting the pests with a pesticidal amount of O-ethyl-S-[2,2-bis(ethylthio)propyl-1]ethylphosphonodithioate.

References Cited

UNITED STATES PATENTS

| | | | |
|---|---|---|---|
| 2,881,201 | 4/1959 | Schrader | 260—948 |
| 3,105,003 | 9/1963 | Walsh et al. | 260—948 |
| 3,373,230 | 3/1968 | Walsh et al. | 260—949 |

ALBERT T. MEYERS, Primary Examiner

VINCENT D. TURNER, Assistant Examiner